United States Patent
Soddu et al.

(10) Patent No.: US 8,710,164 B2
(45) Date of Patent: Apr. 29, 2014

(54) PROCESS FOR THE PREPARATION OF DIENE POLYMERS OF STATISTICAL VINYLARENE-DIENE COPOLYMERS

(75) Inventors: Luca Soddu, Castel San Pietro Terme (IT); Gabriele Veneri, Ravenna (IT)

(73) Assignee: Polimeri Europa S.p.A., San Donato Milanese (IT)

( * ) Notice: Subject to any disclaimer, the term of this patent is extended or adjusted under 35 U.S.C. 154(b) by 0 days.

(21) Appl. No.: 13/877,438

(22) PCT Filed: Sep. 29, 2011

(86) PCT No.: PCT/IB2011/054282
§ 371 (c)(1),
(2), (4) Date: May 23, 2013

(87) PCT Pub. No.: WO2012/046167
PCT Pub. Date: Apr. 12, 2012

(65) Prior Publication Data
US 2013/0245217 A1 Sep. 19, 2013

(30) Foreign Application Priority Data

Oct. 6, 2010 (IT) .............................. MI2010A1826

(51) Int. Cl.
*C08F 4/48* (2006.01)
*C08F 36/04* (2006.01)

(52) U.S. Cl.
USPC ........................ 526/181; 526/173; 526/180

(58) Field of Classification Search
USPC .................. 526/179, 180, 181, 173
See application file for complete search history.

(56) References Cited

U.S. PATENT DOCUMENTS

| 5,625,017 A * | 4/1997 | Morita et al. ................. 526/180 |
| 5,717,043 A * | 2/1998 | Nakayama et al. ........... 526/180 |
| 6,858,683 B2 * | 2/2005 | Viola et al. ...................... 526/86 |
| 2002/0120082 A1 * | 8/2002 | Hsu et al. ...................... 526/180 |
| 2004/0127659 A1 | 7/2004 | Kerns |

FOREIGN PATENT DOCUMENTS

WO    0185805 A2   11/2001

OTHER PUBLICATIONS

Viola, Gian Tommaso, "Coupling Reaction of Polyisoprenyllithium with 1,2-Dibromoethane", J. Polym. Sci., vol. 35, Jan. 21, 2000, pp. 17-25.
Quirk, Roeric, P., et al., "Anionic Synthesis of Chain-End Functionalized Polymers Using 1,1-Diphenylethylene Derivatives Prepration of 4-Hydroxyphenyl-Terminated Polystyrenes", Maromol. Chem., vol. 190, No. 3, Mar. 1, 1989, pp. 487-493.

* cited by examiner

*Primary Examiner* — Fred M Teskin
(74) *Attorney, Agent, or Firm* — Tarolli, Sundheim, Covell & Tummino LLP

(57) ABSTRACT

A process for the preparation of diene polymers or vinylarene-diene statistical (random) copolymers which comprises the anionic (cp) polymerization, in hydrocarbon solvents, of at least one monomer of a conjugated diene, optionally in the presence of a vinyl aryl monomer, and using a compound belonging to the group of lithium alkyls as initiator, characterized in that the total lithium alkyl initiator is modified in situ by means of a reaction with a compound having general formula (I): $R_m$—$(X$—$H)_n$ (I) wherein R is a C2-C20 (cyclo) alkyl or C6-C20 aromatic radical, X is a heteroatom belonging to group VA or group VIA of the periodic system, n is an integer higher than or equal to 1, m is an integer>1 which depends on the valence of the heteroatom X.

12 Claims, No Drawings

PROCESS FOR THE PREPARATION OF DIENE POLYMERS OF STATISTICAL VINYLARENE-DIENE COPOLYMERS

RELATED APPLICATION

This application is a National Phase filing of PCT/IB2011/054282, filed Sep. 29, 2011, and claims priority to Italian Application No. MI2010A001826, filed Oct. 6, 2010, the subject matter of which are incorporated herein by reference in their entirety.

The present invention relates to a process for the preparation of diene polymers or vinylarene-diene statistical (random) copolymers carried out anionically in the presence of organic compounds containing one or more heteroatoms supporting a negative charge and coordinated with the $Li^+$ cation (for example, alkoxides, thiolates, etc.) in order to modify the stability of the living chain-end.

More specifically, the present invention relates to a process for the synthesis of polymers and copolymers based on diene monomers, carried out in hydrocarbon solvents with the use of lithium alkyls as initiators and optionally in the presence of aprotic polar compounds (modifiers) as vinyl-promotor/randomizing agents, characterized by a linear macrostructure and a higher stability of the living carbanionic chain-end.

Even more specifically, the present invention relates to an anionic (co)polymerization process wherein the reactivity of the alkyl, diene and vinylaryl carbanionic chain-ends is modified by the introduction of non-reactive compounds under the polymerization conditions and containing one or more heteroatoms having a negative charge in its turn balanced by the presence of a $Li^+$ cation.

The use of lithium alkyl initiators, in the "living" anionic synthesis of polymers and copolymers, is widely described in its basic features in the literature, as well as the use of aprotic polar substances (modifiers) for the control of the microstructure of the end-product of the synthesis (i.e. the type of the chain insertions when only a monomer of the 1,4 trans, 1,4 cis and 1,2 conjugated diene type is involved for butadiene and the random nature of the distribution of the comonomers in the case of a copolymerization).

The "living" anionic (co)polymerization in solution of hydrocarbons, based on the use of lithium alkyls as initiators, typically provides linear polymers whose polydispersity is strictly related to the type of process used in the synthesis of the same. Monodispersed polymers are obtained from a batch process with a polydispersity $M_w/M_n<1,3$, whereas monodispersed polymers are obtained from a continuous process whose polydispersity depends on the number of CSTR reactors in series used and on the conversion degree which corresponds to each reactor of the series. In the case of a system in series of ideal CSTR reactors and in the presence of a living anionic polymerization free of chain-end reactions, $M_w/M_n \leq 2$, whereas in practice $M_w/M_n \leq 2.3$.

Optional branching can be introduced following various synthesis strategies: for example, the coupling reaction of living chain-ends with halides of elements of group IV of the periodic system having the general formula $MR_nCl_{4-n}$ with n=3 or 4 (silicon tetrachloride $SiCl_4$, and tin tetrachloride $SnCl_4$ can be mentioned, for example) and the formation of statistical (random) branching which uses the production in situ of primary radicals through the reaction between alkyl or allyl carbanions and alkyl bromides, as described in Viola et al., "Coupling Reaction of Polyisoprenyllithium with 1,2 Dibromoethane" *J. Polym. Sci., Part A: Polym Chem.*, Vol. 35, 17-25 (1997) and in U.S. Pat. No. 6,858,683 "Process for the Preparation of SBR Rubbers with an Improved Processability and a Lower Rolling Resistance" (2005).

Although this type of synthesis is defined as "living", there are actually some side-reactions which relate to the synthesis of homopolymers and copolymers from diene and vinyl-aromatic monomers which lead to the deactivation of the living chain-end. This depends on the characteristics of the reaction environment such as temperature, concentration of free monomer and on the optional presence of modifiers. These reactions, as better illustrated hereunder, cause a broadening of the molecular weight distribution which is particularly evident in the case of a continuous process: in this case, in fact, the polydispersity can vary from about 2 to about 3 for a combination of at least two CSTRs in series.

These deactivation reactions can be grouped into two distinct groups:

1. termination by reaction with the protons in alpha position with respect to the heteroatoms of ethers/amines, compounds commonly used as modifiers (i.e. randomizing agents and vinyl-promoters) in the anionic (co)polymerization of diene and vinyl-aromatic monomers. This reaction is significant at temperatures higher than 50° C., depending on the chemical nature of the modifier, i.e. the capacity of the latter of forming stable complexes with the lithium cation. It is known that the effect that a modifier has on the kinetic parameters of the anionic polymerization reaction (i.e. homopolymerization constants, quantity of chain insertions of the vinyl type in a polybutadiene, crossover constants in copolymerization) depends, in addition to the concentration, on the capacity of forming stable complexes with the $Li^+$ counterion. In this sense, the use of chelating ethers, i.e. compounds having two oxygen atoms separated by 2 or 3 carbon atoms, gives, with concentrations of a few hundreds of ppm, homopolymerization constants of butadiene and styrene which, at the same temperature, are obtained using non-chelating ethers (or solvents) such as THF at concentrations which are two orders of magnitude higher. Chelating ethers generally have an equally marked effect on the chain insertions degree of the 1,2 vinyl type in the synthesis of a polybutadiene and on the crossover constants in copolymerization. In the latter case, copolymers are obtained with a distribution of the monomeric units which is very close to ideality (statistical (or random) copolymers). Non-limiting examples of chelating ethers are 2-methoxy ethyl-tetrahydrofuran and 2-methoxy ethyl-tetrahydropyrane, the latter described in U.S. Pat. No. 5,914,378. Actually, it has been observed that the improvement in the kinetic parameters of the processes, in particular the capacity of promoting the chain insertions of the vinyl type and the distribution as random as possible of the monomeric units through the use of particularly effective chelating structures, comes into conflict with the stability of the living carbanionic chain-end. Chelating ethers which strongly interact with the $Li^+$ cation, in fact, favour the termination of the carbanion which takes place by reaction between the same and the protons in alpha position with respect to the oxygen atoms of the ether. The situation, as described in European patent 1,829,906, makes it necessary to search for optimum conditions (i.e. type of modifier and process parameters) in order to obtain products with micro and macro-structural characteristics suitable for the different fields of application.

2. termination by reaction with an allyl proton of a polydiene chain already formed (metalation). This reaction represents the first step of a series of reactions which lead to the formation of thermally induced branching, as described by Viola et al., "Thermolytic Behavior of Polydienyllithium and Polystyryllithium" *J. Polym. Sci., Part A: Polym Chem.*, Vol. 34, 12-24 (1996). Experimental evidence shows that this is a significant mechanism at temperatures higher than about 90° C. if in the presence of modifiers. In the absence of the latter, as for example in the case of the synthesis of a polybutadiene with a content of vinyl units approximately equal to 10%, the reaction becomes significant at temperatures higher than about 110° C.

In both cases, these reactions have a significant influence on the macrostructure of the (co)polymers and consequently on the practical management of the processes used for the synthesis. The effects of the above-mentioned termination reactions can be summarized as follows:

i. Progressive reduction in the concentration of living chain-ends during the homopolymerization or copolymerization reaction. This has considerable impacts on the effectiveness of optional post-modification reactions which depend on the concentration of the living chain-ends. Coupling reactions can be mentioned, for example, with compounds such as $R_{4-n}MCl_n$, which are used for producing star-shaped structures (non-statistical branching) in the distribution of the molecular weights of the end-product. The maximum content which can be obtained for structures of this type, expressed as coupling efficiency in weight percentage with respect to the total weight of the macromolecules, is obtained when the coupling agent is fed stoichiometrically with respect to the total concentration of the carbanionic chain-ends present in the reaction environment which, as previously described, decreases with time due to the deactivation reactions. Furthermore, the progressive reduction in the concentration of the living chain-ends creates rather strict limits in the running of processes (batch or continuous) associated with the production of polymers having a relatively high molecular weight (i.e. $M_n$>250,000 dalton) since the necessity of completely eliminating free monomers from the reaction environment cannot be satisfied by indefinitely increasing the reaction times and temperatures.

ii. Production of long chain branching (or LCB). With respect to the case represented by a linear monodispersed polymer, a significant variation in some of the fundamental rheological properties of the material is obtained, for example the pseudo-plasticity and the characteristics linked to the elongational-type flows. In the field of elastomers for applications in tyre treads (typically Solution Styrene-Butadiene Rubber or SSBR copolymers), the processability, defined as the time necessary for forming a blend between one or more elastomers, the reinforcing filler, typically carbon black or silica, and the vulcanizing formulation, together with the final quality of the same (i.e. optimum dispersion of the ingredients) is another essential characteristic which greatly depends on the presence or absence of branching. It is generally improved by the presence of a certain degree of long chain branching (LCB). It is known that the quality of the elastic lattice after the vulcanization reaction depends on the quality of the blend, and consequently the dynamic properties of the end-product, such as the rolling resistance and hysteretic properties linked to adherence on wet surfaces and braking, derive from this. In the case of a low vinyl polybutadiene, obtained by a continuous process, the presence of long chain branching is important in order to reduce the tendency of the product to give cold flows, with consequent problems in handling during storage and in the final use of the bales of end-product. An excessive quantity of LCB, however, can have a negative effect on the final properties of the end-product in applications such as the modification of plastic materials (HIPS) with respect, for example, to the surface gloss.

iii. Broadening of the width of the distribution curve of the molecular weights (MWD) described by the polydispersity index $M_w/M_n$ wherein $M_w$ and $M_n$ are respectively the weight average molecular weight and the number average molecular weight. This behaviour derives directly from the formation of long chain branching and also from the variation in the concentration of living chain-ends in relation to the reaction time. The polydispersity of a polymeric material is also a parameter which significantly influences some of the fundamental rheological characteristics of the material. It can be observed, in fact, how, with $M_w/M_n$ values>2.5, there is a progressive deterioration in the characteristics of the blend which is reflected in the behaviour of the end-product (tread) as described in the previous point.

Due to the effect of chain-end reactions on the rheological properties of the material and on the final characteristics of the end-products, the necessity of being able to effectively control them in order to obtain products with "optimized" characteristics on the basis of the final application, is evident.

An aim of the present invention is to provide a process capable of increasing the stability of the living carbanionic chain-end in the synthesis of homopolymers and copolymers of diene and vinyl aromatic monomers carried out in hydrocarbon solvents with the use of lithium alkyls as initiators and optionally in the presence of aprotic polar compounds (modifiers) as vinyl-promoter/randomizing agents.

A further aim of the present invention is to provide a process for improving the control of the macrostructure of homopolymers and copolymers of diene and vinyl aromatic monomers obtained by means of anionic synthesis based on the use of lithium alkyls as initiators. The inhibition of side-reactions, connected to the chain-end reaction, leads to products characterized by a linear macrostructure free of statistical (random) branching.

The preparation of (co)polymers using a batch synthesis process typically produces distribution curves of the molecular weights, determined via Gel Eluition Chromatography (GPC), wherein the various molecular species are quite distinct from each other; the presence of branching can therefore be immediately verified and quantified by the presence of species having a multiple molecular weight with respect to that of the parent polymer which, due to the characteristics of "living" copolymerization in a batch process, will depend on the ratio between the overall weight of the monomers present, the concentration in moles of the initiator fed and will have a polydispersity index $M_w/M_n$ of about 1. In the case of a polymer synthesized using a continuous process, although the informations which can be obtained from the molecular weight curve determined via GPC, provide clear indications with regard to the polydispersity, they are no longer sufficient for quantifying the presence of branching. In this case, the determination of the average molecular weight and of the branching degree are determined by means of the SEC/MALLS—Size Exclusion Chromatography/Multi Angle Laser Light Scattering—technique. In the case in point, the content of branching present in the polymer is described by the alpha (α) index. Whereas linear (co)polymers synthesized in continuous have an alpha value of 0.58, highly branched (co)polymers (i.e. the SBR copolymers obtained from processes in emulsion) have an alpha value ranging from 0.35 to 0.40. The intermediate alpha values between 0.58 and 0.35 are correlated with a progressive increase in the branching degree of the copolymer.

More specifically, the present invention relates to a process suitable for modifying the chemical environment and consequently the reactivity of the living alkyl, diene and vinylaryl carbanionic chain-ends in an anionic (vinylarene)-diene (co)polymerization process in order to achieve what is described above. The result is obtained through non-reactive compounds under the polymerization conditions and containing one or more heteroatoms carrying a negative charge, in its turn balanced by the presence of a Li$^+$ cation. The present invention is better described in the enclosed claims which form an integral part of the present description.

According to the present invention, the use in polymerization of polar compounds having general formula (I):

$$R_m-(X-H)_n, \quad (I)$$

wherein R is a linear or cyclic, or aromatic alkyl radical characterized by a number of carbon atoms ranging from 2 to 20, having n functional groups comprising a heteroatom X, belonging to group VA or to group VIA of the periodic system, in its turn bound to a hydrogen atom, allows the chemical environment to be effectively modified and the chain-end side-reactions which lead to an increase in the polydispersity of the polymer, to be controlled. In the general formula, n is higher than or equal to 1, preferably ranging from 1 to 6, m is an integer≥1 which depends on the valence of the heteroatom X.

In the compound having the general formula $R_m-(X-H)_n$, the hydrogen atom bound to the heteroatom is characterized by a pKa which is such that it can be extracted from the lithium alkyl to produce the structure $R_m-(X^-Li^+)_n$ having a negative charge on the heteroatom, balanced by the lithium cation. The pKa, for example, can range from 6 to 25. The molar ratio between the lithium alkyl active for the copolymerization and the compound having general formula (I) ranges from 20 to 0.1, preferably from 2 to 0.2. The polymerization is initiated by the quantity of lithium alkyl which remains after the reaction with the compound containing the heteroatoms having general formula (I). Among the heteroatoms X, oxygen, nitrogen and sulfur can be mentioned for example. Among the families of compounds having general formula (I), alcohols, glycols, phenols, thiols, thiophenols and amines can be mentioned.

Alcohols selected from ethanol, propanol, isopropanol, butanol, isobutanol, t-butyl alcohol, amyl alcohol, isoamyl alcohol, t-amyl alcohol, n-hexanol, n-heptanol, n-octanol, 2-ethyl-1-hexanol and n-dodecanol are preferred, however.

Saturated alicyclic hydrocarbons such as cyclopentane, cyclohexane and the like, saturated aliphatic hydrocarbons such as butane, pentane, hexane, heptane and the like, can be used as hydrocarbon solvents. Mixtures of the above-mentioned hydrocarbon solvents can also be used.

The conjugated diene monomers are selected from 1,3 dienes having from 4 to 12 carbon atoms, preferably from 4 to 8 carbon atoms. Examples of these dienes are 1,3-butadiene, isoprene, 2,3-dimethyl-1,3-butadiene, 1,3-pentadiene (piperylene), 2-methyl-3-ethyl-1,3-butadiene, 1,3-octadiene. In the preferred embodiment, the conjugated diene monomers are selected from 1,3-butadiene and isoprene, preferably 1,3-butadiene.

Examples of vinyl aromatic monomers are 2-vinyl naphthalene, 1-vinyl naphthalene, styrene and relative alkylated compounds. In the preferred embodiment, the vinyl aromatic monomer is styrene.

As polymerization initiators are selected compounds belonging to the group of lithium alkyls having the general formula $R_1(Li)_n$ wherein $R_1$ represents an alkyl radical containing from 1 to 20, preferably from 2 to 8, carbon atoms and n is an integer ranging from 1 to 4. The above alkyl groups can be primary, secondary or tertiary. Examples of these alkyl radicals are methyl, ethyl, n-propyl, isopropyl, n-butyl, sec-butyl, t-butyl, n-pentyl, sec-pentyl, t-pentyl, n-hexyl, sec-hexyl, n-heptyl, n-octyl, n-nonyl and n-dodecyl radicals. Specific examples of lithium alkyls which can be used within the scope of the present invention are n-butyl lithium, n-propyl lithium, isobutyl lithium and t-butyl lithium also mixed with each other. The preferred lithium alkyl is n-butyl lithium.

The vinyl-promoter/randomizing agents are preferably selected from non-cyclic ethers such as ethyl ether, tertiary amines such as tributylamine, cyclic ethers such as tetrahydrofuran (THF), chelating ethers such as ethylene glycol dimethyl ether (dimethylglime), dioxane and 2-methoxy ethyl-tetrahydrofuran (THFA-ethyl) and chelating amines such as N,N,N',N'-tetramethylethylenediamine (TMEDA).

Preferred agents are 2-methoxy ethyl-tetrahydrofuran and 2-methoxy ethyl-tetrahydropyrane.

The application of the process described in the production of (co)polymers based on conjugated diene and vinyl aromatic monomers can take place using batch or continuous synthesis processes, following the consolidated practices for the running and control of the same. In the case of a continuous process, the polymerization can be carried out using either a single reactor or, preferably, various reactors in series, normally from 2 to 5, in order to increase the productivity and to have a better control of the reaction conditions (i.e. temperature and total conversion).

The continuous polymerization is carried out under isothermal conditions within a temperature range of from 30 to 120° C. with a control of ±5° C. and with overall residence times ranging from 30 to 120 minutes.

At the end of the polymerization, which in a batch process means "complete conversion", and at the end of the optional post-modification reactions of the polymer (i.e. coupling reaction with a compound such as SiCl$_4$) and which, in the case of a continuous process, corresponds to the outlet of the train of reactors in series, the polymeric solution is collected in pressurized containers into which an adequate formulation of antioxidants is fed, defined on the basis of the field of application of the end-product.

If required by the type of material synthesized and by the relative field of application, an extender oil, preferably non-aromatic or with a low degree of aromatic products, for example MES (Mild Extraction Solvate) or TDAE (Treated Distillate Aromatic Extract) oils wherein the quantity of aromatic compounds is less than 20%, can be added to the same pressurized containers. The extender oils are normally added in a quantity ranging from 10 to 50 parts of oil per 100 parts of rubber, preferably from 20 to 40 parts of oil per 100 parts of rubber.

The polymer as such or containing the extender oil can be recovered by means of consolidated solvent removal techniques with the use of water vapour (stripping) and the subsequent removal of the water and volatile residues from the crumbs of rubber thus obtained by passage through extruders.

The viscosity of the final product is generally determined by applying the method ASTM D 1646: Mooney viscosity $ML_{1+4}$ 100° C., wherein the sample being examined is preheated for 1 minute in a closed chamber containing a large-dimensioned (L) discoidal rotor, after which a motor is activated, which imposes a rotation of 2 rpm on the rotor for 4 minutes, at the end of which the torque is measured on the axis of the rotor.

The diene elastomers thus obtained can be used alone or mixed with other polymeric and non-polymeric components, in numerous applications which require an optimum control of the macrostructure in the synthesis phase. Examples of possible applications are the modification of thermoplastic materials, such as high impact polystyrene or ABS resins, and the production of elastomeric blends suitable for the production of treads and other tyre components.

In the former case, it is known that a narrower size distribution of the rubber particles included in the matrix of the plastic material is important for optimizing a whole series of characteristics of the end-product, among which resistance to Environmental Stress Cracking, surface gloss and Izod resilience. An excessively broad distribution of the molecular weights induces a non-homogeneity during the grafting reaction which tends to take place preferably on the higher-molecular-weight chains. As a result of this, the distribution curve of the rubber particles size tends to become broader with the consequence of deteriorating the characteristics of the end-product.

In the latter case, it is known that, as described in EP 1,829,906, the SSBR rubbers having a polydispersity index>2.5, generally have qualitatively lower applicative characteristics due to the negative effect of this polydispersity on the properties of the vulcanized product, due to a poorer dispersion of the filler and a consequent deterioration in the dynamic properties of the blend.

In particular, it is observed a deterioration of the dynamic properties of the vulcanized product such as the rolling resistance which is considerably important for applications in blends for treads.

Some applicative and non-limiting examples are provided hereunder.

COMPARATIVE EXAMPLE 1

600 grams of anhydrous cyclohexane and 27 grams of freshly distilled anhydrous butadiene were charged in this order into a 1 liter stirred reactor equipped with a jacket for the circulation of a thermostatic fluid.

The temperature of the reaction mixture was regulated by means of a thermostat at 80° C. and kept constant within ±4° C. for the whole duration of the experiment. 0.5 mmoles of n-butyl lithium were then fed to start the polymerization reaction of butadiene. The reaction conditions are maintained for 60 minutes, after which a quantity of ethyl alcohol is fed, which is equimolecular with respect to the quantity of active n-butyl lithium. The aim is to prevent that, during the discharge operation of the polymeric solution, the chains still active, can lead to coupling reactions by reacting with the oxygen of the air, which, by producing fractions with a double molecular weight with respect to the polymer precursor, would make the interpretation of the results of the characterization ambiguous.

The polymer is finally collected and is coagulated, stabilized with an antioxidant and subjected to determination of the molecular weight distribution via GPC. The results are indicated in Table 1.

COMPARATIVE EXAMPLE 2

600 grams of anhydrous cyclohexane and 27 grams of freshly distilled anhydrous butadiene were charged in this order into a 1 liter stirred reactor equipped with a jacket for the circulation of a thermostatic fluid.

The temperature of the reaction mixture was regulated by means of a thermostat at 120° C. and kept constant within ±4° C. for the whole duration of the experiment. 0.5 mmoles of n-butyl lithium were then fed to start the polymerization reaction of butadiene. The reaction conditions are maintained for 60 minutes, after which a quantity of ethyl alcohol is fed, which is equimolecular with respect to the quantity of active n-butyl lithium. The results are indicated in Table 1.

EXAMPLE 3

600 grams of anhydrous cyclohexane and 27 grams of freshly distilled anhydrous butadiene were charged in this order into a 1 liter stirred reactor equipped with a jacket for the circulation of a thermostatic fluid. 0.5 mmoles of t-butyl alcohol were then introduced.

The temperature of the reaction mixture was regulated by means of a thermostat at 120° C. and kept constant within ±4° C. for the whole duration of the experiment. 1 mmole of n-butyl lithium was then fed in order to obtain a molar ratio between the lithium alcoholate, resulting from the reaction between the n-butyl lithium and t-butyl alcohol, and the n-butyl lithium active for the polymerization, of about 1:1. The reaction conditions are maintained for 60 minutes, after which a quantity of ethyl alcohol is fed, which is equimolecular with respect to the quantity of active n-butyl lithium. The results are indicated in Table 1.

EXAMPLE 4

600 grams of anhydrous cyclohexane and 27 grams of freshly distilled anhydrous butadiene were charged in this order into a 1 liter stirred reactor equipped with a jacket for the circulation of a thermostatic fluid. 1 mmole of t-butyl alcohol was then introduced.

The temperature of the reaction mixture was regulated by means of a thermostat at 120° C. and kept constant within ±4° C. for the whole duration of the experiment. 1.5 mmoles of n-butyl lithium were then fed in order to obtain a molar ratio between the lithium alcoholate, resulting from the reaction between the n-butyl lithium and t-butyl alcohol, and the n-butyl lithium active for the polymerization, of about 2:1. The reaction conditions are maintained for 60 minutes, after which a quantity of ethyl alcohol is fed, which is equimolecular with respect to the quantity of active n-butyl lithium. The results are indicated in Table 1.

TABLE 1

| Examples | Temperature [° C.] | [RO-Li+]/[n-butLi] | $M_w/M_n$ | HMW [%] |
|---|---|---|---|---|
| Comp. example 1 | 80 | 0 | 1.08 | 0 |
| Comp. example 2 | 120 | 0 | 1.23 | 28.0 |
| Example 3 | 120 | 1.1 | 1.19 | 17.1 |
| Example 4 | 120 | 1.9 | 1.14 | 12.2 |

The "High Molecular Weights (HMW)" column of Table indicates the content, expressed in weight percentage, of the multiple molecular weight fractions with respect to that of the polymer precursor. These families of macromolecules originate from the presence of chain-end reactions by metalation of the chain which lead to the formation of statistical (random) branching. The experiment carried out at 80° C. shows that, in the absence of a modifier, this temperature is too low for causing the chain-end reaction and that the polymer is completely free of high-molecular-weight fractions.

COMPARATIVE EXAMPLE 5

600 grams of anhydrous cyclohexane, 27 grams of freshly distilled anhydrous butadiene and 100 ppm of 2-methoxy ethyl-tetrahydrofuran (THFA-ethyl) were charged in this order into a 1 liter stirred reactor equipped with a jacket for the circulation of a thermostatic fluid. The reactor is equipped with a system for continuously measuring the UV-Vis absorption spectra of the polymeric solution. This system consists of a quartz flow cell, having an optical path of 2 mm, connected to the reactor by means of a circuit in which a HPLC pump withdraws the polymeric solution, makes it to pass through the flow cell and sends it back into the reactor. This allows the concentration of the living butadienyl chain-end to be continuously measured, applying the Lambert-Beer law:

$$A = l\epsilon c$$

wherein A is the absorbance, l is the optical path of the measurement cell, $\epsilon$ is the molar extinction coefficient (which for butadienyl in the presence of 2-methoxy ethyl-tetrahydrofuran is about 6,500 $l \cdot cm^{-1} \cdot mol^{-1}$) and c is the molar concentration. The UV-Vis spectrum was measured using a Perkin Elmer Lambda 25 spectrophotometer within the range of 260 to 400 nm, at intervals of 2 minutes between one measurement and another in order to measure the extent of the chain-end reaction.

The temperature of the reaction mixture was regulated by means of a thermostat at 70° C. and kept constant within ±4° C. for the whole duration of the experiment. 1 mmole of n-butyl lithium was then fed to start the polymerization reaction of butadiene. The reaction conditions were maintained for 30 minutes, after which the polymer is collected and coagulated, stabilized with an antioxidant and subjected to determination of the molecular weight distribution via GPC. The results are indicated in Table 2.

EXAMPLE 6

600 grams of anhydrous cyclohexane, 27 grams of freshly distilled anhydrous butadiene and 100 ppm of THFA-ethyl were charged in this order into a 1 liter stirred reactor equipped with a jacket for the circulation of a thermostatic fluid. 1 mmole of t-butyl alcohol was then introduced. The reactor is equipped with a system for continuously measuring the UV-Vis absorption spectra of the polymeric solution, as described in the previous example.

The temperature of the reaction mixture was regulated by means of a thermostat at 70° C. and kept constant within ±4° C. for the whole duration of the experiment. 2 mmoles of n-butyl lithium were then fed in order to obtain a molar ratio between the lithium alcoholate, resulting from the reaction between the n-butyl lithium and t-butyl alcohol, and the n-butyl lithium active for the polymerization, of about 1:1. The reaction conditions were maintained for 30 minutes, after which the polymer is collected and coagulated, stabilized with an antioxidant and subjected to determination of the molecular weight distribution via GPC. The results are indicated in Table 2.

EXAMPLE 7

600 grams of anhydrous cyclohexane, 27 grams of freshly distilled anhydrous butadiene and 100 ppm of THFA-ethyl were charged in this order into a 1 liter stirred reactor equipped with a jacket for the circulation of a thermostatic fluid. 1 mmole of t-butyl alcohol was then introduced. The reactor is equipped with a system for continuously measuring the UV-Vis absorption spectra of the polymeric solution, as described in the previous example.

The temperature of the reaction mixture was regulated by means of a thermostat at 70° C. and kept constant within ±4° C. for the whole duration of the experiment. 3 mmoles of n-butyl lithium were then fed in order to obtain a molar ratio between the lithium alcoholate, resulting from the reaction between the n-butyl lithium and t-butyl alcohol, and the n-butyl lithium active for the polymerization, of about 1.5:1. The reaction conditions were maintained for 30 minutes, after which the polymer is collected and coagulated, stabilized with an antioxidant and subjected to determination of the molecular weight distribution via GPC. The results are indicated in Table 2.

TABLE 2

| Examples | Temperature [° C.] | [RO-Li+]/[n-butLi] | Δ abs [%] |
|---|---|---|---|
| Comparative example 5 | 70 | 0 | −27 |
| Example 6 | 70 | 0.9 | −12 |
| Example 7 | 70 | 1.5 | −8 |

The datum of the last column of Table 2 describes the variation in the absorbance of the butadienyl chain-end within a time range of 2,000 seconds, measured starting after having reached the maximum concentration of the chain-end itself. The values are expressed in percentage variation calculated with respect to the maximum absorbance. It can be observed how, with an increase in the ratio between the lithium alcoholate and active n-butyl lithium, the stability of the living chain-end increases significantly.

COMPARATIVE EXAMPLE 8

8,000 grams of an anhydrous mixture of cyclohexane/hexane in a weight ratio of 9/1, equal to a filling factor of 80%, 2.82 g of randomizing agent/vinyl-promoter (THFA-ethyl), corresponding to 230 ppm, in a molar ratio of about 4:1 with the theoretical quantity of initiator, and subsequently 300 g of styrene and 900 g of butadiene, are charged into a 16 liter stirred reactor. The mixture is heated to a temperature of 40° C. by means of a heating jacket. 0.25 g of lithium n-butyl in cyclohexane (1.6 g of a solution at 15% by weight) are then fed. At this point, the heating of the jacket is excluded and the increase in the temperature of the reaction mass takes place as a result of the exothermicity of the reaction, up to a final temperature (peak temperature) of 80° C. 20 minutes are allowed after having reached the peak temperature, in order to eliminate the free monomers at the end of the polymerization, after which 0.159 g of silicon tetrachloride are added, corresponding to a theoretical 100% coupling efficiency. 20 minutes are allowed for completing the coupling reaction. The polymeric solution is then discharged into a tank where it is stabilized with 0.7 phr of BHT (2,6-diterbutylphenol), 450 g of non-aromatic TDAE (Treated Distillate Aromatic Extract) oil are added and the whole mixture reaches the desolventizing section by stripping with water. The material thus obtained is characterized by means of SEC for measuring the parameters of the molecular weight distribution. The results are indicated in Table 3.

EXAMPLE 9

8,000 grams of an anhydrous mixture of cyclohexane/hexane in a weight ratio of 9/1, equal to a filling factor of 80%, 2.82 g of randomizing agent/vinyl-promoter (THFA-ethyl), corresponding to 230 ppm, in a molar ratio of about 4:1 with the theoretical quantity of initiator, and subsequently 300 g of styrene and 900 g of butadiene, are charged into a 16 liter stirred reactor. The mixture is heated to a temperature of 40° C. by means of a heating jacket. 0.56 g of 2-methyl-2-propanol and 0.72 g of lithium n-butyl in cyclohexane (4.8 g of a solution at 15% by weight) are then fed, for a final molar ratio of lithium alcoholate with respect to the lithium alkyl active for the polymerization of 2:1. At this point, the heating of the jacket is excluded and the increase in the temperature of the reaction mass takes place as a result of the exothermicity of the reaction, up to a final temperature (peak temperature) of 77° C. 20 minutes are allowed after having reached the peak temperature, in order to eliminate the free monomers at the end of the polymerization, after which 0.159 g of silicon tetrachloride are added, corresponding to a theoretical 100% coupling efficiency. 20 minutes are allowed for completing the coupling reaction. The polymeric solution is then discharged into a tank where it is stabilized with 0.7 phr of BHT (2,6-diterbutylphenol), 450 g of non-aromatic TDAE oil are added and the whole mixture reaches the desolventizing section by stripping with water. The material thus obtained is characterized by means of SEC for measuring the parameters of the molecular weight distribution. The results are indicated in Table 3.

Irganox® 565 and Irgafos® 168 in such a quantity that the content in the end-product was 0.1% and 0.4% respectively. The process solvent was subsequently removed from the polymer using the standard stripping procedure in a stream of vapour and dried by extrusion. The results are indicated in Table 4.

COMPARATIVE EXAMPLE 11

The polymerization was carried out following the process conditions described in the previous example but increasing the residence times up to 60 minutes for each reactor in order to reduce the quantity of free monomers present at the end of the polymerization train. As in the previous example, a solvent/monomer mixture containing 9% by weight of butadiene and 3% by weight of styrene was fed, together with 100 ppm of randomizing agent/vinyl-promoter THFA-ethyl. The quantity of n-butyl lithium fed as initiator is equal to 0.028 g with respect to 100 g of monomeric mixture. Under these conditions, the inlet temperature of the first reactor is 45° C. and the outlet temperature is 94° C. After deactivation of the polymeric solution, the non-aromatic extender oil TDAE was added to the polymeric solution using an on-line mixer, in a quantity equal to 27.5% together with a mixture of antioxidants consisting of Irganox® 565 and Irgafos® 168 in such a

TABLE 3

| Ex. | Stirene [%] | 1, 2 [%] | MW AB [dalton] | Wc [%] | $M_n$ tot [dalton] | $M_p$ [dalton] | $M_w$ tot [dalton] | D | ML dry | ML oe |
|---|---|---|---|---|---|---|---|---|---|---|
| Ex. 8 | 24.8 | 66.5 | 320000 | 80 | 875000 | 1020000 | 970500 | 1.11 | 215 | 86.3 |
| Ex. 9 | 25.3 | 66.1 | 335000 | 96 | 1035000 | 1088600 | 1070500 | 1.05 | 238 | 96.1 |

It can be observed that the introduction of lithium alcoholate has improved the stability of the living chain-end enabling significantly higher coupling efficiencies to be reached.

COMPARATIVE EXAMPLE 10

The polymerizations were carried out in a pair of CSTR reactors in series, each of which has a volume of 100 liters. The feeding of the reagents is carried out by means of pumps controlled by flow-rate mass meters. The mixture of reagents (cyclohexane, monomers, vinyl-promoter/randomizing agent, antifouling agent) is prepared in a stirred reactor in an inert atmosphere so that the composition remains constant for the whole duration of the test. The initiator, as such or modified, is fed directly to the first CSTR of the series. The residence times are managed through the control of the inlet flow-rates whereas the reaction temperature is determined by regulating the temperature of the solvent/monomer mixture and on the basis of the thermal setting of the reaction.

The polymerization according to Example 3 was carried out following the conditions described above with residence times of 45 minutes for each reactor, feeding a solvent/monomer mixture containing 9% by weight of butadiene and 3% by weight of styrene, together with 100 ppm of randomizing agent/vinyl-promoter (THFA-ethyl). The quantity of n-butyl lithium fed as initiator is equal to 0.028 g with respect to 100 g of monomeric mixture. Under these conditions, the inlet temperature of the first reactor is 48° C. and the outlet temperature is 93° C. After deactivation of the polymeric solution, the non-aromatic extender oil TDAE was added to the polymeric solution using an on-line mixer, in a quantity equal to 27.5% together with a mixture of antioxidants consisting of quantity that the content in the end-product was 0.1% and 0.4% respectively. The process solvent was subsequently removed from the polymer using the standard stripping procedure in a stream of vapour and dried by extrusion. The results are indicated in Table 4.

EXAMPLE 12

The polymerization was carried out following the process conditions described in the previous example with residence times of 60 minutes for each reactor, feeding a solvent/monomer mixture containing 9% by weight of butadiene and 3% by weight of styrene, together with 100 ppm of randomizing agent/vinyl-promoter THFA-ethyl. In order to prepare the modified initiator, an on-line mixer is used, into which 2-ethyl-1-hexanol and lithium n-butyl flow in continuous. The conditions are such as to guarantee a reaction time between the two reagents of at least 5'. The quantity of n-butyl lithium fed is equal to 0.112 g with respect to 100 g of monomeric mixture and the quantity of 2-ethyl-1-hexanol is 0.171 g with respect to 100 g of monomeric mixture. The molar ratio between lithium alcoholate and lithium alkyl active for the polymerization is 3:1. Under these conditions, the inlet temperature of the first reactor is 49° C. and the outlet temperature is 92° C. After deactivation of the polymeric solution, the non-aromatic extender oil TDAE was added to the polymeric solution using an on-line mixer, in a quantity equal to 27.5% together with a mixture of antioxidants consisting of Irganox® 565 and Irgafos® 168 in such a quantity that the content in the end-product was 0.1% and 0.4% respectively. The process solvent was subsequently removed from the polymer using the standard stripping procedure in a stream of vapour and dried by extrusion. The results are indicated in Table 4.

TABLE 4

|  | r.t. [min] | R | Sty [%] | Vinyl [&] | $M_n$ [dalton] | $M_w$ [dalton] | D | α | [BDE] [ppm] | [Sty] [ppm] |
|---|---|---|---|---|---|---|---|---|---|---|
| Comp. Ex. 10 | 45 | 0 | 26.5 | 24.9 | 242,000 | 651,000 | 2.69 | 0.54 | 70 | 220 |
| Comp. Ex. 11 | 60 | 0 | 26.1 | 24.3 | 239,000 | 657,000 | 2.75 | 0.53 | 120 | 365 |
| Ex. 12 | 60 | 3 | 25.8 | 23.8 | 254,000 | 560,000 | 2.2 | 0.58 | <5 | 30 |

Definitions:
r.t.: residence time in each reactor
R: molar ratio between lithium alcoholate and lithium alkyl active for the polymerization
C: polydispersity index
α: alpha MALLS index
[BDE]: content of unreacted butadiene at the outlet of the second reactor
[Sty]: content of unreacted styrene at the outlet of the second reactor In the cases illustrated in Examples 10 and 11, the value of the α MALLS index (0.54 and 0.53 respectively) and the trend of the gyration radius with respect to the molecular weights indicate that the branching are concentrated on the high MW fractions, whereas in the case illustrated in Example 12, the α MALLS index (0.58) and the trend of the gyration radius with respect to the molecular weights does not reveal a significant presence of branching. The result is supported by the corresponding polydispersity index values. As far as the content of free monomers measured at the outlet of the second reactor is concerned, it can be observed that, in the absence of lithium alcoholate, the increase in residence times for each single reactor from 45 minutes to 60 minutes is uneffective for reducing the content of free monomers at the outlet of a series of CSTRs. Example 12, on the other hand, shows that the higher stability of the living chain-ends due to the presence of lithium alcoholate makes the increase in the average residence times effective for reducing the content of unreacted monomers.

COMPARATIVE EXAMPLE 13

The polymerization of a low-vinyl polybutadiene was carried out using a continuous process with a configuration analogous to what is described in the previous examples, with the difference that the second CSTR has a volume of 50 liters. The average residence time on the first reactor is 60 minutes, the concentration of butadiene in the solvent (n-hexane) is 20% and the synthesis takes place at a temperature of 135° C. The quantity of n-butyl lithium fed is equal to 0.035 g per 100 g of monomer. A quantity of 0.015 g of antifouling agent is added per 100 g of monomer. Under these conditions, the conversion is almost complete in the first reactor and the product undergoes a significant thermal formation reaction of long chain branching. After deactivation of the polymeric solution, a mixture of antioxidants consisting of Irganox® 565 and Irgafos® 168 was added to the polymeric solution in such a quantity that the content in the end-product was 0.1% and 0.4% respectively. The process solvent was subsequently removed from the polymer using the standard stripping procedure in a stream of vapour and dried by extrusion. The results are indicated in Table 5.

EXAMPLE 14

The polymerization of a low-vinyl polybutadiene was carried out using a continuous process with a configuration analogous to what is described in Example 6. The average residence time on the first reactor is minutes, the concentration of butadiene in the solvent (n-hexane) is 20% and the synthesis takes place at a temperature of 135° C. A quantity of 0.015 g of antifouling agent is added per 100 g of monomer.

In order to prepare the modified initiator, an on-line mixer is used, into which 2-ethyl-1-hexanol and lithium n-butyl flow in continuous. The conditions are such as to guarantee a reaction time between the two reagents of at least 5 minutes. The quantity of n-butyl lithium fed is equal to 0.105 g with respect to 100 g of monomeric mixture and the quantity of 2-ethyl-1-hexanol is 0.142 g with respect to 100 g of monomeric mixture. The molar ratio between lithium alcoholate and lithium alkyl active for the polymerization is 2:1. Also under these conditions, the conversion is almost complete in the first reactor. After deactivation of the polymeric solution, a mixture of antioxidants consisting of Irganox® 565 and Irgafos® 168 was added to the polymeric solution in such a quantity that the content in the end-product was 0.1% and 0.4%, respectively. The process solvent was subsequently removed from the polymer using the standard stripping procedure in a stream of vapour and dried by extrusion. The results are indicated in Table 5.

TABLE 5

|  | R [mol]/[mol] | $M_n$ [dalton] | $M_w$ [dalton] | D | α |
|---|---|---|---|---|---|
| Example 13 | 0 | 185,000 | 577,000 | 3.12 | 0.47 |
| Example 14 | 2 | 192,000 | 424,000 | 2.21 | 0.56 |

Also for this pair of examples, it can be seen that the use of lithium alcoholate is effective for reducing the polydispersity of the polymer and, as indicated by the value of α MALLS index, the presence of branching.

The invention claimed is:

1. A process for the preparation of diene polymers or vinylarene-diene statistical copolymers comprising:
    anionic (co)polymerization, in hydrocarbon solvents, of at least one monomer of a conjugated diene, optionally in the presence of a vinyl aryl monomer, and using a compound belonging to the group of lithium alkyls as initiator, characterized in that the total lithium alkyl initiator is modified in situ by means of a reaction with a compound having general formula (I):

$$R_m—(X—H)_n \qquad (I)$$

wherein R is a $C_2$-$C_{20}$ (cyclo)alkyl or $C_6$-$C_{20}$ aromatic radical, X is a heteroatom belonging to group VIA of the periodic system, n is an integer higher than or equal to 1, m is an integer ≥1 which depends on the valence of the heteroatom X.

2. The process according to claim 1, wherein an overall amount of functional groups X—H is in a substoichiometric ratio with respect to the total lithium alkyl fed.

3. The process according to claim 1, wherein the hydrogen atom in the compound having general formula (I) is characterized by a pKa which is such that it can be extracted from the lithium alkyl to produce a structure having a negative charge on the heteroatom, balanced by the lithium cation $R_m$—$(X$—$Li^+)_n$.

4. The process according to claim 3, wherein the pKa ranges from 6 to 25.

5. The process according to claim 1, wherein the molar ratio between the lithium alkyl active for the (co)polymerization and the compound having general formula (I) ranges from 20 to 0.1.

6. The process according to claim 1, wherein, in the compound having general formula (I), the heteroatom X is selected from oxygen and sulfur.

7. The process according to claim 1, wherein the conjugated diene monomer is selected from 1,3 dienes containing from 4 to 12 carbon atoms.

8. The process according to claim 7, wherein the conjugated diene monomer is butadiene.

9. The process according to claim 1, wherein the vinylaryl monomer is styrene.

10. The process according to claim 1, wherein R is the 2-ethyl-1-hexyl radical.

11. The process according to claim 1, wherein the anionic (co)polymerization takes place in the presence of vinyl-promoter/randomizing agents selected from non-cyclic ethers selected from ethyl ether, tertiary amines selected from tributylamine, cyclic ethers selected from tetrahydrofuran (THF), chelating ethers selected from ethylene glycol dimethyl ether (dimethylglime), dioxane and 2-methoxy ethyl-tetrahydrofuran (THFA-ethyl) and chelating amines selected from N,N,N',N'-tetramethylenethylenediamine (TMEDA).

12. The process according to claim 11, wherein the vinyl-promoter/randomizing agent is selected from 2-methoxy ethyl-tetrahydrofuran and 2-methoxy ethyl-tetrahydropyrane.

* * * * *